United States Patent [19]

Guim et al.

[11] Patent Number: 4,607,209

[45] Date of Patent: Aug. 19, 1986

[54] SAFETY BOOSTER CABLE

[75] Inventors: Raul Guim, Coral Gables; José L. Lara, Miami, both of Fla.

[73] Assignee: Guim Industries, Inc., Coral Gables, Fla.

[21] Appl. No.: 609,030

[22] Filed: May 10, 1984

[51] Int. Cl.⁴ .............................................. H02J 7/00
[52] U.S. Cl. .................................... 320/25; 339/29 B
[58] Field of Search ........................................ 320/2–5, 320/26, 25, 48; 339/29 B

[56] References Cited

U.S. PATENT DOCUMENTS

| | | | |
|---|---|---|---|
| 3,654,538 | 4/1972 | Gardberg | 320/25 X |
| 3,659,183 | 4/1972 | Carlson | 320/48 |
| 4,163,134 | 7/1979 | Budrose | 320/47 X |
| 4,166,241 | 8/1979 | Grant | 320/25 |
| 4,233,552 | 11/1980 | Baumbach | 320/25 X |
| 4,349,774 | 9/1982 | Farque | 320/25 |

*Primary Examiner*—R. J. Hickey
*Attorney, Agent, or Firm*—Jesus Sanchelima

[57] ABSTRACT

A safety booster cable assembly for charging batteries from a D.C. source having one conductor for each electrode and one of those electrodes being normally interrupted by a relay, when there is no current through it, and the relay circuit is closed when the polarities of the conductors correspond. An AND, NAND or other suitable logic function, has its inputs connected to the source and battery electrodes connected through the normally interrupted conductor so that a suitable output is provided, when the polarities match, to activate the coil of the relay.

5 Claims, 2 Drawing Figures

SAFETY BOOSTER CABLE

BACKGROUND OF THE INVENTION

1. Field of the Invention

The present invention relates to booster cables for batteries and more particularly to safety boosters that prevent short circuits (with the consequent sparks) of the batteries or D.C. power source if the polarities are inadvertently inverted.

2. Description of the Prior Art

The common booster cable used today to charge a battery or to jump electricity from one automobile to another consists of two plain conductors, typically with clip terminations, that connect the positive and negative electrodes of one battery or power source to the corresponding electrodes of the battery being charged. It is not unusual that while connecting the cables to one of the batteries, the other end of the booster cables is dropped or moved and the corresponding clip terminations contact each other thereby producing a short circuit of the power source. This may create a hazardous condition since sparks should be avoided in the areas where these batteries are located which are commonly proximate to flammable substances such as gasoline.

The present invention eliminates this problem even if the improved booster cable is connected to the wrong polarity electrodes. No other device is found in the market or the literature reviewed by the applicant that would accomplish this.

Other patents describing the closest subject matter provide for a number of more or less complicated features that fail to solve the problem in an efficient and economical way. None of these patents suggest the novel features of the present invention.

SUMMARY OF THE INVENTION

It is the main object of the present invention to provide a booster cable that is safe to use even if the user inadvertently allows the termination clips to come in contact with each other while the other end of the cable is connected to a power source.

It is another object of the present invention to provide a booster cable that becomes inoperative if the clip terminations are connected to the wrong electrodes.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
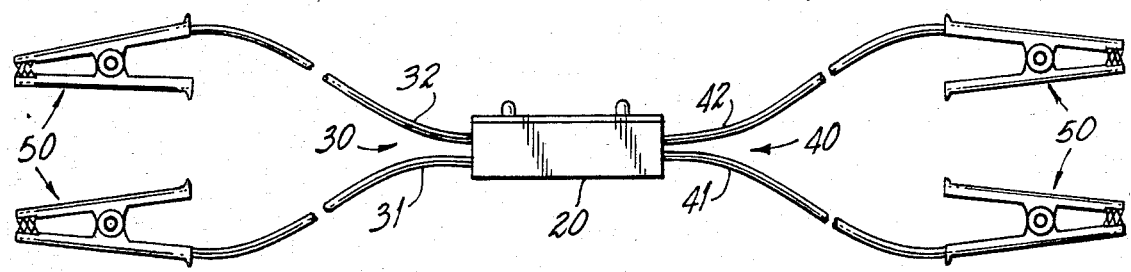
FIG. 1 represents the improved booster cable.

Referring to FIG. 1, it can be seen that the safety booster cable assembly is generally referred to with numeral 10 and it includes generally a circuit box 20 and two pairs of conductors 30 and 40, each conductor terminated with spring loaded clips or clamps 50, in the preferred embodiment, on one of its ends.

Figure 2:
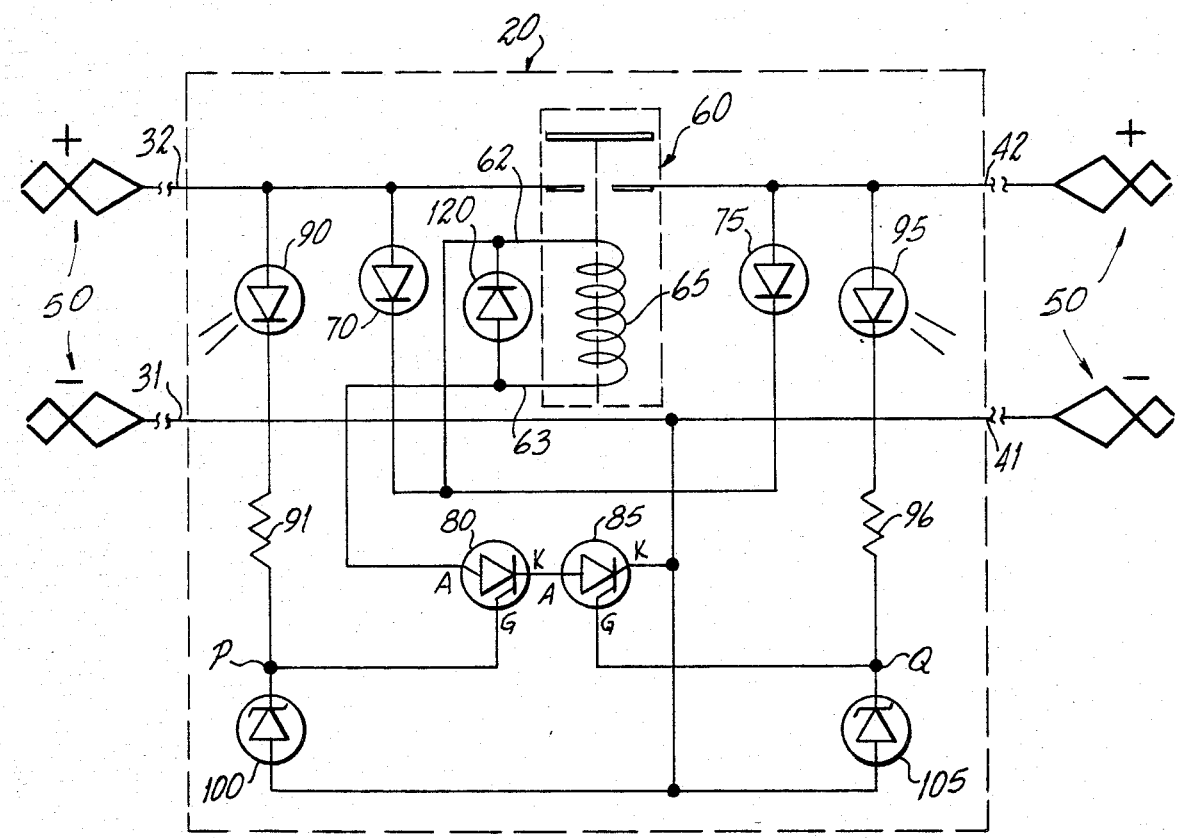
FIG. 2 shows a schematic of the circuit utilized in the improved booster cable.

Two of the other four ends of the two pairs of conductors 30 and 40 are connected directly, as shown in FIG. 2, and referred to with numerals 31 and 41. The other two ends 32 and 42 are connected together through the normally open contact 61 of relay 60. Conductor ends 32 and 42 are also connected to diodes 70 and 75, which is in practice an insulator because they are connected back-to-back, and the electrical point between the two diodes is connected to terminal 62 of coil 65 of relay 60. Terminal 63 of coil 65 is connected to AND-connected SCR devices 80 and 85 through the anode of transistor 80. The SCR devices used in the preferred embodiment correspond to Radio Shack's part No. 276-1067 which require approximately two volts across the gate to cathode junction and about 6 mA. Diode 120 is used to supprese transients.

Therefore, either one of devices 80 or 85 will be in cut-off condition if either wire pair 30 or wire pair 40 is connected with the wrong polarity, which in turn prevents the closing of the circuit of coil 65.

Light emmitting diodes 90 and 95 are connected to conductor 32 and 42, respectively, on one end and the other end being connected to zener diodes 100 and 105, respectively. The gate of SCR device 80 is connected to point P between resistor 91 and zener diode 100 so that when, in the preferred embodiment, conductor 32 is connected to the positive electrode of a DC power source, a voltage drop of approximately 2.0 volts is present across zener diode 100 which causes transistor 80 to be switched on if SCR device 85 is also switched on. For SCR device 85 to be switched on, conductor 42 must be connected to a battery capable of producing a voltage of at least said two volts plus the voltage drop of LED 95 and the voltage drop across resistor 96. This will prevent cable assembly 10 from operating with catastrophically discharged batteries that may represent a hazardous condition. Therefore, two conditions must be met for the AND ed devices 80 and 85 to be switched on. First, a positive voltage (correct polarity in the preferred embodiment shown here) must appear from conductors 31 to 32, and secondly, the proper polarization must appear between conductors 41 and 42 and have at least 2.7 volts, approximately. Any battery being charged with a voltage below this value would not make cable assembly 10 work, including the case of a short circuit between conductors 41 and 42. The short circuit condition may occur if conductors 41 and 42 are accidentally allowed to come in contact with each other. Also, if the user attempts to charge a battery connected without observing the correct polarity connections, assembly 10 will be inoperative thereby preventing a hazardous condition. It is necessary for relay 60 to close contact 61 that these two conditions be met, namely: that the correct polarity be observed and that the battery being charged has at least a minimum voltage of 2.4 volts in the preferred embodiment. Otherwise, contact 61 will continue to interrupt the electrical connection of conductors 31 and 41, because coil 65 will not be activated since devices 80 and 85 are off if any one of these conditions, or both, are not met. SCR devices 80 and 85 may be implemented with any suitable thyristor devices, including TRIAC.

The present safety booster cable assembly may be used reversibly, that is, wire pair 30 may be connected to the D.C. source or to the battery being charged and wire pair 40 would be connected accordingly.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A safety booster cable assembly for transmitting electric current from a D.C. source, having two electrodes, to a battery, having two electrodes, comprising:
   A. first conductor means for connecting one of the electrodes of said D.C. source to an electrode in said battery;
   B. second conductor means connecting the other electrodes of said source and battery;
   C. relay means, adapted to interrupt the connection between said electrodes if the polarity of said source and battery electrodes do not correspond and said relay means includes two inputs and further includes two diodes, each diode having a negative and a positive electrode, and said negative electrodes being connected to each other and to one of said relay means inputs and said positive diode electrodes being connected to said other electrodes of said source and battery so that said other electrodes remain insulated from each other;
   D. AND gating means having one input connected to said other electrode of said source and the other input connected to said other electrode of said battery so that a suitable output for activating said relay means is produced only when the polarity of said electrodes is the same thereby signifying the same logic level and said other relay means input being connected to the output of said AND gating means so that said relay means is activated when said output is at one of its two logic states.

2. The device set forth in claim 1, wherein said AND gating means includes two thyristors having their respective gates connected to said other electrodes of said source and battery and the cathode of one connected to the anode of the other, and further having the anode of said one connected to said other input of said coil and the cathode of the other thyristor connected to said first conductor so that a suitable output may be produced to close the circuit of said coil when the polarity of said source and battery match and their voltages are above a predetermined minimum voltage required to fire said thyristors.

3. The device set forth in claim 2, wherein the inputs to said gates include a series resistor connected to said other electrodes of said other electrodes of said source and battery.

4. The device set forth in claim 3, wherein the inputs to said gates include an LED for each gate connected in series with said resistor.

5. The device set forth in claim 4, wherein the inputs to said gates include a zener diode for each gate connected between the gate and said first conductor means.

* * * * *